(12) United States Patent
English

(10) Patent No.: US 6,359,833 B1
(45) Date of Patent: Mar. 19, 2002

(54) UNDERWATER SMALL TARGET WEAPON

(75) Inventor: Thomas P. English, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/770,793

(22) Filed: Jan. 29, 2001

(51) Int. Cl.[7] .............................. G01S 11/14; G01S 5/14
(52) U.S. Cl. ....................................... 367/133
(58) Field of Search .................................. 367/133, 134, 367/131; 89/1.13; 244/3.12; 114/316, 328, 330, 331, 338

(56) References Cited

U.S. PATENT DOCUMENTS 5,579,285 A * 11/1996 Hubert ........................ 367/133

FOREIGN PATENT DOCUMENTS

GB          2177352 A   *  1/1987

* cited by examiner

*Primary Examiner*—Daniel T. Pihulic
(74) *Attorney, Agent, or Firm*—Donald G. Peck; Harvey A. Gilbert

(57) ABSTRACT

A small target weapon (STW) delivers a warhead to a remote target and detonates it in response to remote command signals from a swimmer delivery vehicle (SDV) and internal control signals generated by a self-contained internal electronics section. When deployed from the SDV, STW is capable of traveling several nautical miles underwater. The STW contains a warhead section and has a spool of optical fiber disposed aft to deploy optical fiber from the housing as it transits through water from a submerged delivery vehicle. Motor-driven propellers disposed aft on the housing of the STW propel it the through the water, and a mast member extends above the housing. Control fins disposed aft on the housing, a vertical thruster and the motor driven propellers are controlled by electronics sections and guidance and control sections to selectively keep the housing beneath the surface of the water and the mast member extending through the surface. Sensor systems on the mast member and a sonar system on the housing provide GPS data signals, optical data signals, non-visible radiation, and sonar data signals, and radio, acoustic, and optical command signals from the SDV steer the STW to and detonate warhead section at the target. GPS signals sensed on the mast member that extends above the water while the rest of STW is submerged assure navigation as STW traverses the distance from the SDV to the target. The cameras, non visible light sources, and antennas on mast member also may be used to locate, identify, and transit to the target. During the terminal phase of the run to the target, the STW may activate the onboard sonar to acquire and home-in on the target.

16 Claims, 2 Drawing Sheets

UNDERWATER SMALL TARGET WEAPON

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to undersea vehicles guided to a remote location. More particularly, this invention provides an undersea small target weapon remotely controlled and guided by remote signals and/or onboard navigational systems to a distant target where it is detonated.

Currently, no multi navigational capability exists for submerged deployment of ordnance to a target located at a safe standoff distance several nautical miles from a submerged command station. When their single mode of guidance is frustrated or a component fails in most torpedo-like vehicles, a mission goes down, and, usually, greater risks must be taken to successfully complete it. In particular, underwater navigation or imaging an area underwater at night with non-visible light and/or onboard sonar hasn't been combined within the body of a small weapon that is remotely operated. No undersea compact weapon has a camera with attached GPS antenna, non-visible light source, and sonar.

Thus, in accordance with this inventive concept, a need has been recognized in the state of the art for a small target weapon for a warhead guided to a distant target from a control station by combined navigational aids including visual and/or infrared cameras, GPS with an attached GPS antenna, non-visible light sources, and sonars.

SUMMARY OF THE INVENTION

The present invention provides an unmanned submersible including an elongate housing containing a warhead section and having a spool of optical fiber disposed aft to deploy optical fiber from the housing as it transits through water from a submerged delivery vehicle. Motor-driven propellers disposed aft on the housing radially outwardly from the spool of optical fiber provide propulsion through the water, and a mast member disposed forward on the housing extends above the housing and the surface of the water. Fins disposed aft on the housing, a vertical thruster having a propeller assembly, and the motor driven propellers are controlled by electronics and guidance and control sections to selectively maintain the housing beneath the surface of the water and keep the mast member extending through the surface. Sensor systems on the mast member and a sonar system on the housing provide GPS data signals, optical data signals, non-visible radiation and sonar data signals, and radio, acoustic, and optical command signals from the submerged delivery vehicle steer it to and detonate warhead section at the target.

An object of the invention is to provide a small target weapon capable of neutralizing a target of interest at a safe standoff distance of several nautical miles from a swimmer delivery vehicle.

Another object of the invention is to provide a remotely guided, small target weapon capable of underwater navigation and/or imaging underwater at night with onboard sonar and/or non-visible light source.

Another object of the invention is to provide an undersea small target weapon incorporating a camera with an attached GPS antenna, non-visible light source, and sonar.

Another object is to provide an underwater small target weapon providing remote visual inspection of a target prior to neutralization.

Another object is to provide a small target weapon having sonar to detect obstacles or underwater threats.

An object of the invention is to provide an undersea small target weapon having a camera system operating in spectrums not easily detected by the human eye.

Another object is to provide a submersible small target weapon having a camera system and GPS antenna on the same mast member.

These and other objects of the invention will become more readily apparent from the ensuing specification when taken in conjunction with the appended claims.

BRIEF DESCRIPTION OF THE DRAWINGS

FIG. 3 is an end view of the small target weapon.

DESCRIPTION OF THE PREFERRED EMBODIMENT

Figure 1:
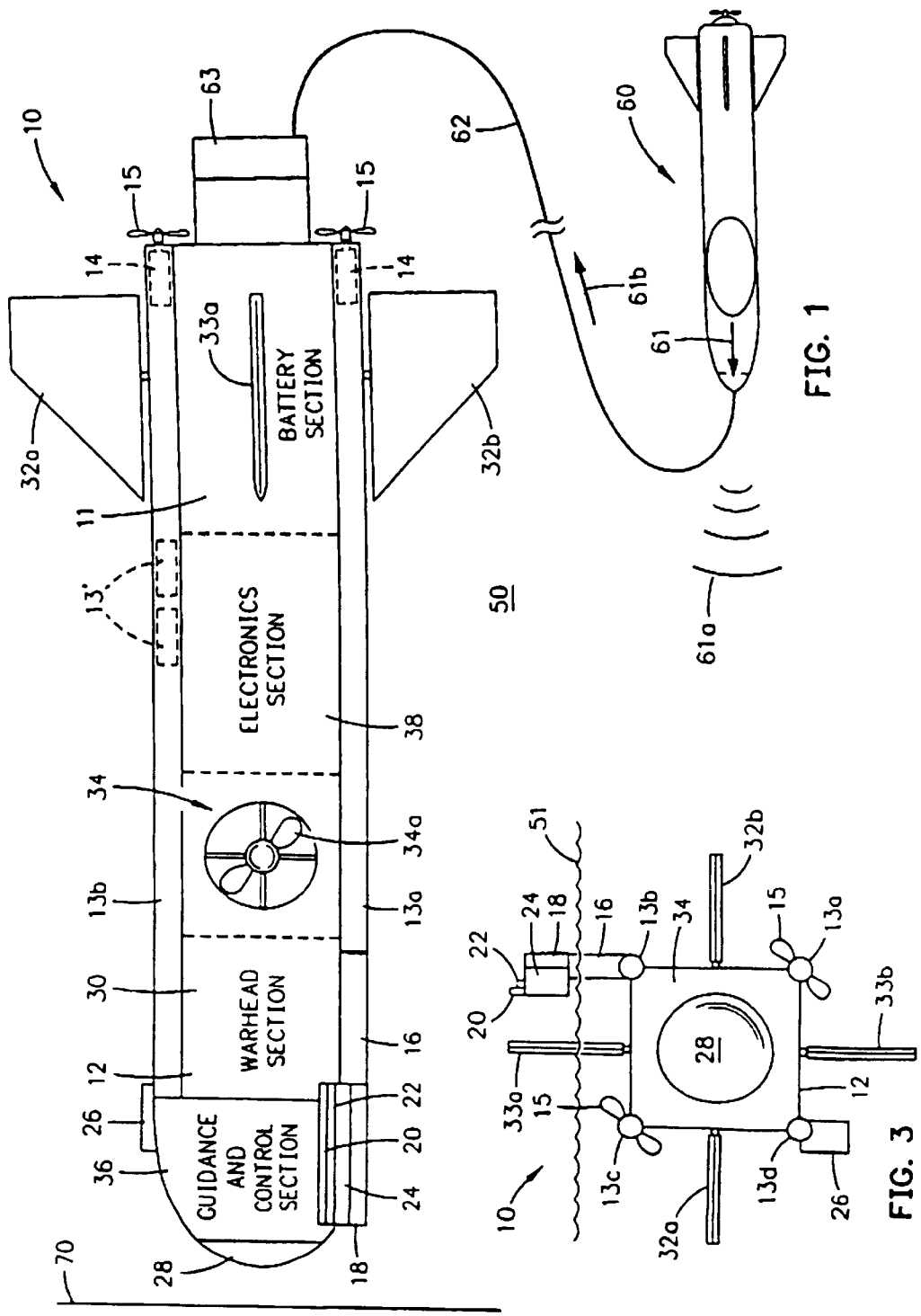
FIG. 1 is a schematic cross-sectional top view of the small target weapon of this invention.
Figure 2:
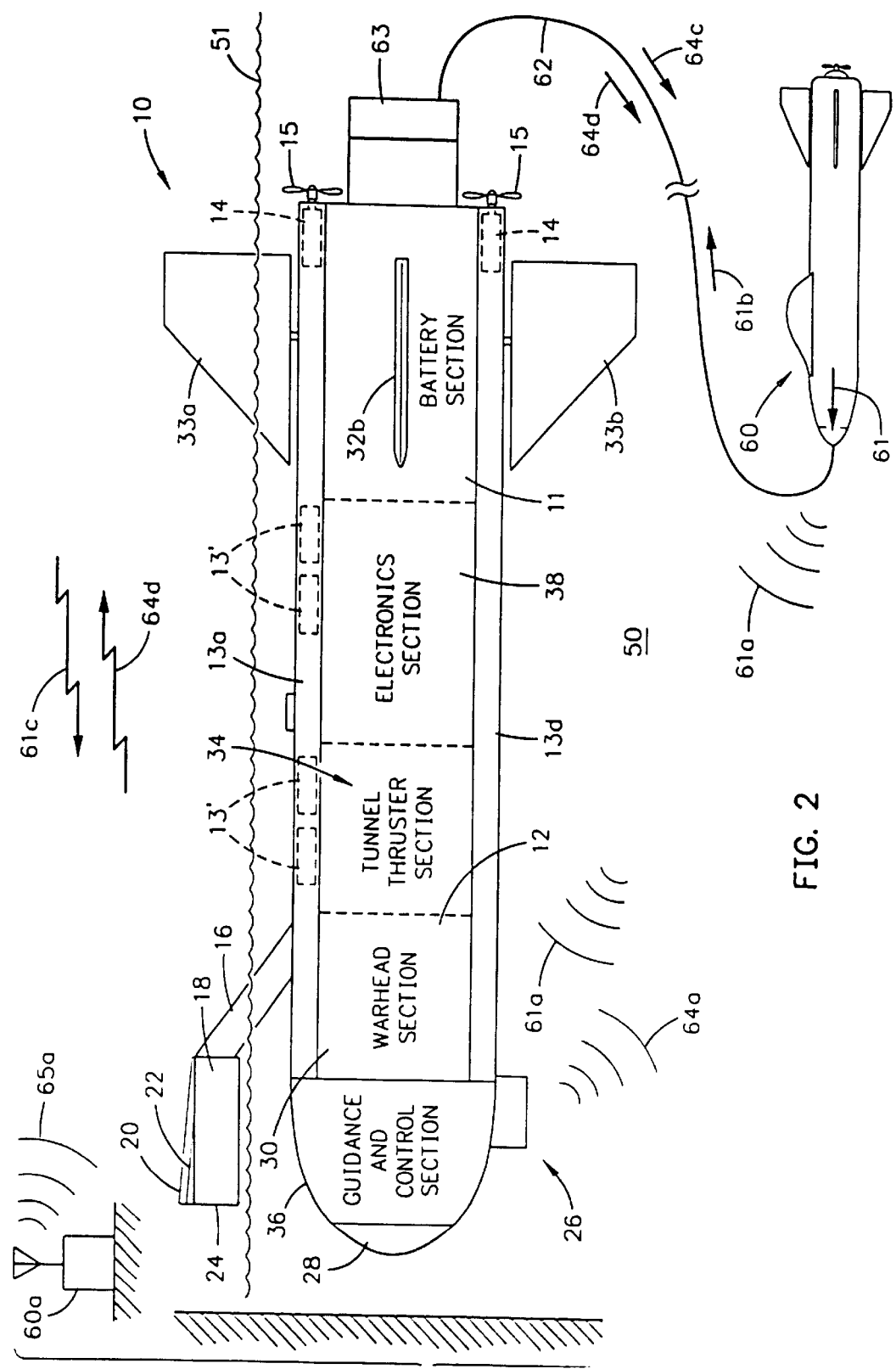
FIG. 2 is a schematic cross-sectional side view of the small target weapon of this invention.

Referring to FIGS. 1, 2, and 3, small target weapon (STW) 10 of this invention is an unmanned submersible controlled during its submerged transit from a distant swimmer delivery vehicle (SDV) 60 to target 70. STW 10 and SDV 60 usually complete their mission entirely underwater, and STW 10 is sized to be transported by and deployed from SDV 60, although STW 10 could be transported by air to the region of target 70 and SDV 60 and airdropped via a releasable parachute when this type of deployment would be expedient.

Command signals 61 are transmitted from SDV 60 as acoustic command signals 61a in water 50, optical command signals 61b in optical fiber 62 that unspools from spool 63 as STW 10 continues toward target 70, or radio command signals 61c from SDV 60 or signals 65a from some other remote command station 60a. Command signals 61 control STW 10 and bring it in contact with, or at least come within a lethal radius of target 70.

STW 10 has elongate box-shaped or cylindrically-shaped housing 12. Either shaped housing 12 can be made from metal or lightweight synthetic materials having sufficient strength to bear pressures exerted by ambient water as STW 10 dives to avoid detection, maneuvers, and proceeds submerged during completion of a mission.

Four elongate pylons 13a, 13b, 13c, and 13d are orthogonally, symmetrically mounted about housing 12 and longitudinally extend the length of housing 12. Pylons 13a, 13b, 13c, and 13d each contain batteries 13' and possibly some electronics for control purposes. Batteries 13' may be appropriately coupled to power sections and modules to be described. Each pylon houses an electric motor 14 for rotating a propeller 15 aft on housing 12. Each electric motor 14 is connected to battery section 11 inside housing 12 for power to propel STW 10.

Mast member 16 extends from pylon 13a forward on housing 12 and supports camera system 18 above housing 12. As STW 10 transits to the region of target 70 just below surface 51 of water 50, the smaller, less conspicuous camera system 18 may be periodically, or continuously above surface 51 and the larger bulk of STW 10 is not readily detectable visually or by radar. Camera system 18 has a combination of optical sensing and imaging devices for light that includes radiations in the visible, infrared, and ultraviolet spectrums, and for other radiations in other spectrums. The appropriate sensors, imagers, receivers, detectors, etc., may be contained in mast member 16, or they may be located inside housing 12 and suitably connected to appropriate lenses, optical fibers, waveguides, antennas, and appropriate conductors of such radiations in mast member 16. In either case, the data signals provided by camera system 18 are fed to processing, logic, and relay modules (not shown) in electronics section 38 in housing 12.

GPS antenna 20 is mounted adjacent to camera system 18 at the upper surface of mast member 16. GPS antenna 20 is held above surface 51 as mast member 16 extends through it. This small exposure of GPS antenna 20 is enough to sense GPS data signals representative of the position of STW 10 from orbiting satellites without compromising the location of STW 10. The received GPS data signals can be used for steering STW 10 and may be relayed to SDV 60 for tactical purposes.

Radio antenna 22 is mounted on mast member 16 to be above surface 51 and receive radio command signals 61$c$ transmitted from surfaced SDV 60, or other distant command stations (not shown). Radio antenna 22 also can transmit radio data signals 64$d$ to distant stations if desired.

Non-visible light source system 24 is mounted on mast member 16 to place it above the surface 51 during near-surface transit of STW 10. Non-visible light source system 24 can emit radiation in the infrared, ultraviolet, or other spectrums that are non-visible to irradiate, or illuminate objects above surface 51 and below in water 50 including target 70. Appropriate sensors in camera system 18 receive reflected portions of the non-visible radiation and provide representative data signals of ambient features for appropriate processing in STW 10 to avoid obstacles, for example, and relay the received data to SDV 60.

The small size and usually intermittent limited exposure of non-visible light system 24, radio antenna 22, GPS antenna 20, camera system 18, and mast member 16 do not draw attention to them. These sensors do not need to be exposed above surface 51 for the duration or final phases of a mission, but are exposed only when it is safe to check progress along a course. Thus, the submerged bulk of STW 10 is hidden in water 50 as position information, command signals, and other data is received and relayed while STW 10 proceeds to target 70.

Sonar system 26 is located low and forward on housing 12 on pylon 13$d$ and has at least one transducer to project acoustic energy through water 50 to ensonify a region. The same transducer, or at least one other transducer of sonar system 26 receives reflected portions of the ensonifying acoustic energy (like a hydrophone) to provide acoustic data signals representative of ambient marine features, such as target 70 and marine topography. Sonar system 26 may be restricted in range to about one hundred meters for acoustic homing during the terminal phase to target 70. However, in addition to terminal phase homing, transducers and internal processor modules in electronics section 38 of sonar system 26 can have increased capabilities to allow acoustic communications by transmitting acoustic data signals 64$a$ and receiving acoustic command signals 61$a$ to and from SDV 60 and other stations.

The information of the received data signals from camera system 18, GPS antenna 20, radio antenna 22, non-visible light source 24, and sonar system 26, can be utilized separately or in combination by onboard processing modules in electronics section 38 for navigation, avoidance of obstacles, and countermeasures by STW 10. Selected portions of the information can be relayed to SDV 60 via acoustic data signals 64$a$ from sonar system 26, optical data signals 64$b$ over optical fiber 62, and radio data signals 64$d$. GPS data signals 64$c$ can be relayed back as part of the signals of acoustic data signals 64$a$, optical data signals 64$c$, and/or radio data signals 64$d$.

An impact switch, or contact detonator 28 is carried on the forward most part of housing 12. When STW 10 is driven into target 70, impact switch 28 initiates detonation of warhead section 30. Warhead section 30 can be a bulk or shaped charge of many different explosives with appropriate fusing, detonators, and boosters to detonate reliably and disable or destroy target 70. Warhead section 30 can include a detonator (not shown) to detonate warhead section 30 when STW 10 is in the proximity, or lethal radius of target 70. This proximity detonator can be activated when acoustic targeting signals are projected from a transducer of sonar system 26 and are received as reflected acoustic target signals by a hydrophone transducer of sonar system 26. The proximity detector can be preset to detonate warhead section 30 when the received reflected acoustic target signals indicate that STW 10 is within the lethal radius of target 70. Warhead section 30 could include another detonator (not shown) that is initiated to detonate it when an appropriate command signal 61$a$, 61$b$, or 61$c$ is received by STW 10. This gives an operator in SDV 60 the option to detonate warhead section 30 at target 70 or at some other target of opportunity during a mission.

STW 10 is guided to impact target 60 by controlling pivotable horizontal control fins 32$a$ and 32$b$, pivotable vertical control fins 33$a$ and 33$b$, and vertical tunnel thruster 34 next to warhead section 30. The four control fins 32$a$, 32$b$, 33$a$, and 33$b$ are symmetrically, orthogonally mounted aft about housing 12. Fins 32$a$ and 32$b$ are selectably rotated by interconnected electric motors (not shown) separately or together about a horizontal axis through STW 10, and fins 33$a$ and 33$b$ are selectably rotated by interconnected electric motors (not shown) separately or together about a vertical axis through STW 10. Thus, each of control fins 32$a$, 32$b$, 33$a$, and 33$b$ may be selectably rotated so that STW 10 can turn, bank, pitch, roll, dive, and climb as it progresses to target 70. These control fins could also have a variety of flaps and vented surfaces to function as additional control surfaces if desired. Although FIG. 2 shows fin 33$a$ extending through surface 51, fin 33$a$ may be made smaller to keep it below surface 51, or STW 10 may come to surface 51 at an incline to keep fin 33$a$ submerged.

Vertical tunnel thruster 34 can be a shrouded electric motor-driven single propeller or counter rotating propeller assembly 34$a$ to hover STW 10 while it is stopped and not proceeding forward. In addition, tunnel thruster 34 can augment the controlled upward and downward motions of STW 10 created by rotation of horizontal fins 32$a$ and 32$b$ when STW 10 is in transit. Appropriate rotation of propeller assembly 34$a$ of thruster 34 can sustain, or hover STW 10 at a desired depth beneath surface 51, or such rotation of assembly 34 can hold mast member 16 and its systems and antennas above the surface of water 50 while STW 10 is in transit or at rest to assure reliable operation for the duration. This feature permits STW 10 to cruise with mast member 16 out of the water and hover while remaining motionless beneath surface 51. While hovering, mast member 16 extending through surface 51 does not create a visible wake on water 50.

In addition to the selective control of STW 10 that is implemented by fins 32a, 32b, 33a, and 33d and tunnel thruster 34, electric motors 14 can be reversed to selectably reverse the rotation of propellers 15. Propellers 15 are symmetrically, orthogonally mounted aft about housing 12 in-line with pylons 13a, 13b, 13c, and 13d to effect responsive control of STW 10. Propellers 15 are located radially outwardly from optical fiber spool 63 to avoid breaking optical fiber 62 as it unspools during transit of STW 10. Reversible, controllable propellers 15 can further augment maneuvering of STW 10 to avoid obstacles and proceed to target 70; however, care must be exercised not to sever optical fiber 62. Actuating signals for the motors connected to fins 32a, 32b, 33a, 33b, tunnel thruster section 34 and propellers 15 are created in guidance and control section 36.

Guidance and control section 36 generates actuating signals at the proper magnitudes and durations in response to internal control signals created in electronics section 38. In accordance with many such systems known in the art, actuating signals from modules in guidance and control section 36 are suitably coupled to effect responsive displacements of electric motors connected to fins 32a, 32b, 33a, and 33b, tunnel thruster 34, and propellers 15 to responsively steer and guide STW 10 in direction, speed, depth, and evasive maneuvers to target 70. The power for operation of guidance and control section 36 and for the motors connected to the fins, thruster, and propellers comes through suitable connections extending to both battery section 11 and batteries 13'.

Electronics section 36 in housing 12 has processing and logic modules (not shown) coupled to receive the data signals from camera system 18, GPS antenna 20, radio antenna 22, and sonar system 26. The processing and logic modules included electronics section 36 are well known in the art and are included in STW 10 to process incoming data signals from camera system 18, GPS antenna 20, radio antenna 22, and sonar system 26, to create appropriate internal control signals, and feed these internal control signals to guidance and control section 36. Electronics section 36 additionally has processing, logic and transceiver modules responsive to acoustic command signals 61a received by hydrophone transducer of sonar system 26, optical command signals 61b received over optical fiber 62, and radio command signals 61c received by radio antenna 22. When these command signals are coupled to electronics section 36, appropriate processing and logic modules in electronics section 36 create internal control signals for guidance and control section 36 for generation of actuating signals. These actuating signals responsively steer and guide STW 10 in direction, speed, depth, and evasive maneuvers to target 70. Thus, the combination of controllable fins and propellers gives STW 10 great maneuverability to surmount obstacles, evade countermeasures, and precisely deliver weapon section 30 to target 70.

STW 10 in accordance with this invention is an underwater weapon carried to the region of target 70 by SDV 60 to deliver warhead section 30 to neutralize target 70 and other targets of opportunity. After being deployed from SDV 60, STW 10 has sufficient power in battery section 11 and batteries 13' to travel several nautical miles underwater. Electronics section 38 in housing 12 has processing and logic modules (not shown) coupled to receive the data signals from camera system 18, GPS antenna 20, radio antenna 22, and sonar system 26. The processing and logic modules included in electronics section 38 are well known in the art and are included in STW 10 to process incoming data signals from camera system 18, GPS antenna 20, radio antenna 22, and sonar system 26, to create appropriate internal control signals, and feed these internal control signals to guidance and control section 36. Electronics section 38 additionally has processing, logic and transceiver modules responsive to acoustic command signals 61a received by hydrophone transducer of sonar system 26, optical command signals 61b received over optical fiber 62, and radio command signals 61c received by radio antenna 22. When these command signals are coupled to electronics section 38, appropriate processing and logic modules in electronics section 38 create internal control signals for guidance and control section 36 for generation of actuating signals. These actuating signals responsively steer and guide STW 10 in direction, speed, depth, and evasive maneuvers to target 70. Thus, the combination of controllable fins and propellers gives STW 10 great maneuverability to surmount obstacles, evade countermeasures, and precisely deliver weapon section 30 to target 70.

Operational deployment of STW 10 begins with coming within range of target 70, separating STW 10 a safe distance from SDV 60, and powering-up STW 10. During this procedure, both STW 10 and SDV 60 are underwater and cannot be seen. An operator in SDV 60 performs a series of tests to check the functions of STW 10. Appropriate modules in sections 11, 30, 36, and 38 in STW 10 are preprogrammed and activated to enable STW 10 to run a predetermined, preprogrammed course to target 70. At a safe standoff distance which is beyond the distance that the explosion of warhead section 30 can be tolerated 30, a safe and arm mechanism associated with warhead section 30 begins to arm section 30. When complete, the operator sends command signals 61a, 61b, or 61c to initiate motor-driven propellers 15. Another command signal 61a, 61b, or 61c from the operator may cause STW 10 to proceed beneath surface 51 50 at a depth just below surface 51. This depth keeps camera system 18 above the surface so that appropriate consoles being monitored by the operator can be used to guide STW 10 to target 70. While STW 10 is traversing to target 70, the position of STW 10, as indicated by GPS signals received by GPS antenna 20, is relayed to and displayed on the operator's control console.

Should the operator desire to approach target 70 undetected, appropriate command signals can be sent to STW 10 to cause it to dive to and proceed at a depth where camera system 18 is no longer held above the surface but GPS antenna 20 is still above the surface. GPS data signals 64c can be transmitted from STW 10 to SDV 60 as acoustic data signals 64a, optical data signals 64b, and/or radio data signals 64d if radio antenna 22 extends through surface 51. The operator can then navigate STW 10 using the navigational information of GPS signals received by GPS antenna 20 and known target location. After STW 10 is within the terminal homing capability of sonar system 26, STW 10 may be programmed in electronics section 38 to automatically begin a terminal run to target 70. STW 10 may detonate on contact with target 70 or it can be detonated by command signals 61 from the operator.

STW 10 can operate in the automatic or manual mode. Either way, STW 10 is capable of performing remote neutralization of targets while at a safe standoff distance for the crew of SDV 60. The automatic mode uses GPS signals during preprogrammed initial phases and has sonar system 26 in the terminal phase to provide tactical information to guide STW 10 to target 70. In automatic mode contact of impact switch 28 with target 70 initiates detonation of warhead section 30, although proximity detection might be relied upon for detonation.

In the manual mode the operator in SDV 60 controls STW 10 to the target and then initiates detonation of the weapon from an on board control console (not shown) in SDV 60. Once STW 10 is deployed from SDV 60, the control console allows control of STW 10 for the duration of the selected mission and has four displays, the tactical display, touch screen, sonar display, and video display. The tactical display provides a scenario including, position, attitude, and status of STW 10, target 70 or desired GPS location of target 70, sonar search sector of STW 10, and environmental data. The touch screen allows control of STW 10 during all phases of the mission. The sonar display can be active search format, or can provide a passive capability for some targets. The sector azimuth of sonar system 26 can be selected during run out of STW 10 and may be progressively narrowed as STW 10 approaches the region of target 70. Signals representative of the video display are sent from STW 10 via optical data signals 64b over optical fiber 62.

In either mode acoustic signals of sonar system 26 can provide for underwater navigation when the operator decides to navigate using known underwater landmarks. Non-visible light source 24 on mast member 16 permits the operator on SDV 60 to use camera system 18 underwater, above water, and/or at night while avoiding detection from the surface. The combination of non-visible light source 24 and optical sensing and imaging devices for non-visible spectrums of camera system 18 is another navigation tool for the operator that allows inspection of target 70 in the manual mode of operation, or interdiction activities.

In accordance with this invention STW 10 is deployed from SDV 60 and the operator in SDV 60 takes control of STW 10 and begins transiting to the intended GPS location of target 70 in either the manual or automatic mode. While traversing to target 70 during the initial phase, the operator can bring STW 10 to within a half meter of surface 51. GPS antenna 20 on mast member 16 receives GPS signals from orbiting satellites and feeds them to modules of a GPS processing system in electronics section 38 to guide STW 10 to the proper location. Since camera system 18 is above surface 51, the location of STW 10 as established by the GPS signals can be verified. The accurate tracking provided by visual and/or other spectral monitoring via camera system 18 and/or GPS tracking can be done intermittently or continuously on the way to target 70. Once STW 10 is in the desired region of target 70, the operator surveys it in detail via camera system 18. Vertical tunnel thruster 34 provides station keeping, or hovering to permit detailed inspection of target 70 for a number of purposes. The capabilities of camera system 18 may be used to precisely position STW 10 manually and the operator gives the command to detonate warhead section 30.

In the automatic mode, GPS coordinates indicative of the location of target 70 would be programmed into the appropriate modules of the GPS system in electronics section 38. In response to internal control signals from electronics section 38, appropriate actuating signals from guidance and control unit 36 would steer STW 10 along a predetermined course to bring target 70 within the range of sonar system 26. Target 70 is acquired by the transducers and the modules associated with sonar system 26, and electronics section 38 and guidance and control section 36 respond to ranging data of sonar system 26 to steer STW 10 during a terminal stage into target 70 for detonation of warhead section 30.

Having the teachings of this invention in mind, modifications and alternate embodiments of this invention may be adapted. STW 10 can be made in many different sizes and configurations for reliable operation in different operational scenarios. Thus, STW 10 additionally can be used for round-trip missions such as, the unobserved delivery of packages, ordnance, electronics, supplies, etc.

The disclosed components and their arrangements as disclosed herein all contribute to the novel features of this invention. STW 10 provides a covert, quick and cost-effective way to deliver ordnance to an undersea target without introducing unnecessary complications or exposing personnel to danger. Therefore, STW 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An unmanned submersible comprising:
    an elongate housing having a spool of optical fiber disposed aft to deploy optical fiber from said housing during transit through water from a submerged delivery vehicle;
    a warhead section in said housing;
    motor-driven propellers disposed aft on said housing and radially outwardly from said spool of optical fiber to propel said housing through said water;
    a mast member disposed forward on said housing to extend above said housing and the surface of said water;
    a plurality of fins disposed aft on said housing;
    a vertical thruster having a propeller assembly;
    an electronics section in said housing; and
    a guidance and control section in said housing coupled to said electronics section and to said fins, said motor driven propellers, and said vertical thruster, said motor driven propeller, said fins, and said propeller assembly being controlled by said electronics section and said guidance and control section to selectively maintain said housing beneath said surface of said water and said mast member extending through said surface of said water.

2. An interface system according to claim 1 wherein said vertical thruster, said motor driven propellers, said fins, and said propeller assembly selectively maintain said housing beneath said surface of said water and said mast member extending through said surface of said water during transiting and hovering therein.

3. An unmanned submersible according to claim 2 further comprising:
    at least part of a GPS system on said mast member to provide GPS data signals representative of location of said unmanned submersible as said mast member extends through said surface of said water;
    at least part of a camera system on said mast member to provide data signals representative of ambient features; and
    a non-visible light source on said mast member to radiate said non-visible light for said camera system.

4. An unmanned submersible according to claim 3 further comprising:
    a sonar system mounted low and forward on said housing to project acoustic energy signals to ensonify a region and receive reflected portions of said ensonifying acoustic energy to provide acoustic data signals representative of ambient marine features.

5. An unmanned submersible according to claim 4 wherein said sonar system receives acoustic command signals from and transmits said acoustic data signals to said submerged delivery vehicle to permit acoustic communication with said submerged delivery vehicle.

6. An unmanned submersible according to claim 5 further comprising:
a radio antenna on said mast member to receive radio command signals from said delivery vehicle when it is on the surface.

7. An unmanned submersible according to claim 6 wherein said radio antenna may be used to transmit radio data signals to said delivery vehicle.

8. An unmanned submersible according to claim 7 wherein said electronics section inside said housing has processing and logic modules coupled to receive data signals from said camera system, said GPS antenna, said radio antenna, and said sonar system to create internal control signals.

9. An unmanned submersible according to claim 8 wherein said electronics section further includes processing, logic and transceiver modules responsive to acoustic command signals received by said sonar system, optical command signals received over said optical fiber, and radio command signals received by said radio antenna to create internal control signals.

10. An unmanned submersible according to claim 9 wherein said guidance and control section in said housing coupled to said electronics section generates actuating signals in response to internal control signals.

11. An unmanned submersible according to claim 10 wherein said actuating signals are coupled to said fins, said tunnel thruster, and said propellers to effect responsive displacements thereof.

12. An unmanned submersible according to claim 11 further comprising:
a contact detonator forward in said housing to detonate said warhead section upon contact with a target.

13. An unmanned submersible according to claim 12 further comprising:
a proximity detonator in said warhead section preset to detonate said warhead section at a lethal proximity of said target.

14. An unmanned submersible according to claim 13 wherein said electronics section and guidance and control section are preprogrammable to operate in a programmed automatic mode of guidance and detonation of said warhead section at said target, and said electronics section and guidance and control section are operable in a manual mode of operation by an operator in said delivery vehicle that sends command signals to transit to said target and detonate said warhead section.

15. An unmanned submersible according to claim 14 wherein said non-visible light source system mounted on said mast member allows operation of said camera system underwater, above water, and at night to avoid detection from the surface and allow navigation to and inspection of said target.

16. An unmanned, underwater small target weapon to destroy a target in the water comprising:
an elongate housing having a spool of optical fiber disposed aft to deploy optical fiber from said housing during transit through water from a swimmer delivery vehicle;
a warhead section in said housing capable of neutralizing a target;
motor-driven propellers disposed aft on said housing and radially outwardly from said spool of optical fiber to propel said housing through said water;
a mast member disposed forward on said housing to extend above said housing and the surface of said water;
a plurality of fins disposed aft on said housing;
a vertical thruster having a propeller assembly, said motor driven propeller, said fins, and said propeller assembly being controlled to selectively maintain said housing beneath said surface of said water and said mast member extending through said surface of said water, said vertical thruster, said motor driven propellers, said fins, and said propeller assembly selectively maintaining said housing beneath said surface of said water and said mast member extending through said surface of said water during transiting and hovering therein;
at least part of a GPS system on said mast member to provide GPS data signals representative of location of said small target weapon as said mast member extends through said surface of said water;
at least part of a camera system on said mast member to provide data signals representative of ambient features;
a non-visible light source on said mast member to radiate said non-visible light for said camera system, said non-visible light source system mounted on said mast member allowing operation of said camera system underwater, above water, and at night to avoid detection from the surface and allow navigation to and inspection of said target;
a sonar system mounted low and forward on said housing to project acoustic energy signals to ensonify a region and receive reflected portions of said ensonifying acoustic energy to provide acoustic data signals representative of ambient features, said sonar system receiving acoustic command signals from and transmitting said acoustic data signals to said swimmer delivery vehicle to permit acoustic communication with said swimmer delivery vehicle;
a radio antenna on said mast member to receive radio command signals from said swimmer delivery vehicle when it is on the surface, said radio antenna being used to transmit radio data signals to said swimmer delivery vehicle;
an electronics section inside said housing having processing and logic modules coupled to receive data signals from said camera system, said GPS antenna, said radio antenna, and said sonar system to create internal control signals, said electronics section including processing, logic and transceiver modules responsive to acoustic command signals received by said sonar system, optical command signals received over said optical fiber, and radio command signals received by said radio antenna to create internal control signals;
a guidance and control section in said housing coupled to said electronics section to generate actuating signals in response to internal control signals, said actuating signals being coupled to said fins, said tunnel thruster, and said propellers to effect responsive displacements thereof, said electronics section and guidance and control section being preprogrammable to operate in a programmed automatic mode of guidance to and detonation of said warhead section at said target, and said electronics section and guidance and control section being operable in a manual mode of operation by an operator in said delivery vehicle that sends command signals to transit to said target and detonate said warhead section;

a contact detonator forward in said housing to detonate said warhead section upon contact with said target; and a proximity detonator in said warhead section preset to detonate said warhead section at a lethal proximity of said target.

* * * * *